(12) United States Patent
Crawford et al.

(10) Patent No.: US 10,809,479 B2
(45) Date of Patent: Oct. 20, 2020

(54) FIBER OPTIC CASSETTE SYSTEM WITH REVERSIBLE CASSETTES

(71) Applicant: BELDEN CANADA INC., Saint-Laurent (CA)

(72) Inventors: Dwayne Crawford, Pointe-Claire (CA); Olivier Kedzierski, Notre-Dame de l'Île-Perrot (CA)

(73) Assignee: BELDEN CANADA ULC (CA)

( * ) Notice: Subject to any disclaimer, the term of this patent is extended or adjusted under 35 U.S.C. 154(b) by 0 days.

(21) Appl. No.: 16/249,442

(22) Filed: Jan. 16, 2019

(65) Prior Publication Data

US 2019/0219786 A1    Jul. 18, 2019

Related U.S. Application Data

(60) Provisional application No. 62/617,844, filed on Jan. 16, 2018.

(51) Int. Cl.
*G02B 6/44* (2006.01)
*H04Q 1/00* (2006.01)

(52) U.S. Cl.
CPC .......... *G02B 6/4453* (2013.01); *G02B 6/447* (2013.01); *H04Q 1/00* (2013.01)

(58) Field of Classification Search
CPC .... G02B 6/4453; G02B 6/4455; G02B 6/447; H04Q 1/00
See application file for complete search history.

(56) References Cited

U.S. PATENT DOCUMENTS

| | | | | |
|---|---|---|---|---|
| 8,452,148 B2* | 5/2013 | Cooke | .................. | G02B 6/4455 |
| | | | | 385/135 |
| 9,678,295 B2* | 6/2017 | Giraud | ................. | G02B 6/4452 |
| 10,094,996 B2* | 10/2018 | Cooke | .................. | G02B 6/4455 |
| 10,215,944 B2* | 2/2019 | Sedor | .................. | G02B 6/4452 |
| 10,598,884 B2* | 3/2020 | Fontaine | .............. | G02B 6/4455 |
| 2019/0101717 A1* | 4/2019 | Pilon | ..................... | G02B 6/4455 |

* cited by examiner

*Primary Examiner* — Daniel Petkovsek
(74) *Attorney, Agent, or Firm* — Lavery, De Billy, LLP; Hugh Mansfield

(57) ABSTRACT

A reversible fiber optic cassette for mounting with other like cassettes in a rack comprising a cassette receiving tray, the tray comprising a plurality of cassette engaging features on an upper surface is disclosed. The cassette comprises N duplex pairs of optic fiber receptacles arranged along a front thereof, a multifiber receptacle on a back thereof and 2*N optic fiber segments each between a respective one of the optic fiber receptacles and the multifiber receptacle, N discrete port identifiers on a first surface thereof and N discrete port identifiers on a second surface opposite the first surface. The first set of N identifiers is the same as the second set of N identifiers and for M between 1 to N, an $M^{th}$ port identifier of the first set and an $(N-M+1)^{th}$ port identifier of the second set is adjacent an $M^{th}$ one of the duplex pairs of optic fiber receptacles.

8 Claims, 5 Drawing Sheets

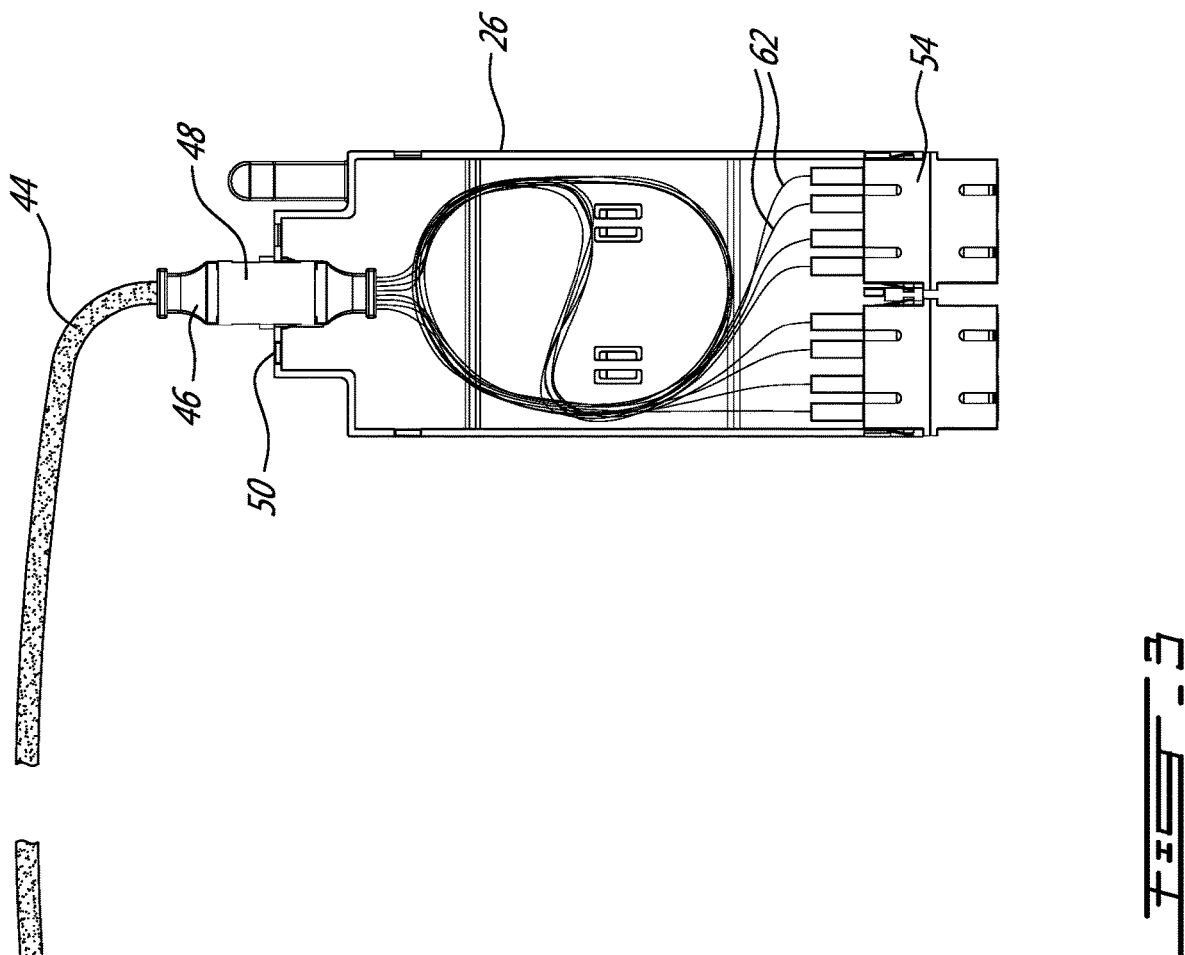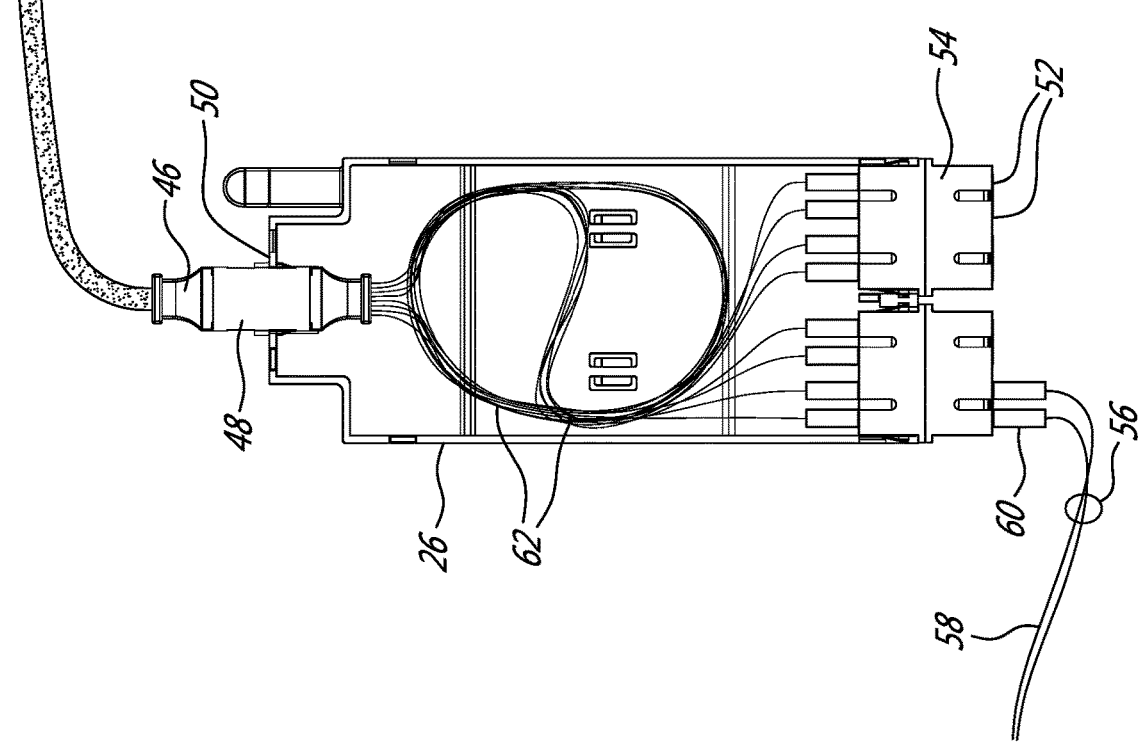
FIG. 3

FIBER OPTIC CASSETTE SYSTEM WITH REVERSIBLE CASSETTES

CROSS REFERENCE TO RELATED APPLICATIONS

This application claims benefit under 35 U.S.C. § 119(e) of U.S. provisional application Ser. No. 62/617,844 filed on Jan. 16, 2018 which is incorporated herein in its entirety by reference.

FIELD OF THE INVENTION

The present invention relates to a fiber optic cassette system with reversible cassettes.

BACKGROUND OF THE INVENTION

Fiber optic cross connect systems typically comprise a plurality of modular cassettes each comprising a plurality of duplex pairs of single fiber receptacles arranged along a front face for receiving respective duplex pairs of optic fibres. In turn the cassettes may be interconnected with other cassettes using a multi-fiber trunk or the like via a multifibre receptacle on the rearward face. The single fiber receptacles and the multi-fiber receptacles are interconnected by fiber optic segments retained within the cassette and such that signals received at one or other of the single fiber receptacles are relayed to respective one of the multi-fiber optic fibres and vice versa. One drawback is that interconnection of a first modular cassette with a second modular cassette via a multi fiber trunk cable reverses the order of the individual optic fibers which must be taken into account when interconnecting equipment using the cassettes.

SUMMARY OF THE INVENTION

In order to address the above and other drawbacks, there is provided a fiber optic cassette system comprising a case comprising a tray slideably received within a tray receiving space for movement between a stored position and an accessible position, a plurality of substantially flat rectangular fiber optic cassettes each comprising a housing comprising a top surface and a bottom surface and arrangeable horizontally in parallel side by side along a front end of the tray in one of a first position wherein the bottom surface is secured to the tray and a second position wherein the top surface is secured to the tray and such that when arranged on the tray in either the first position or the second position a forward portion of the housing of each of the cassettes extends in front of the tray, each of the cassettes further comprising an even plurality of N duplex pairs of optic fiber receptacles arranged along a front thereof, a multifiber receptacle on a back thereof and 2*N optic fiber segments each between a respective one of the optic fiber receptacles and the multifiber receptacle, a first set of N discrete port identifiers on the top surface and visible from above when the cassette is in the first position, each of the first set of port identifiers adjacent and identifying respective ones of the duplex pairs of optic fiber receptacles, and a second set of N discrete port identifiers on the bottom surface and visible from above when the cassette is in the second position, each of the second set of N port identifiers adjacent and identifying respective ones of the pairs of optic fiber receptacles wherein the first set of N identifiers is the same as the second set of N identifiers and wherein for M between 1 to N, an $M^{th}$ port identifier of the first set and an $(N-M+1)^{th}$ port identifier of the second set is adjacent an $M^{th}$ one of the duplex pairs of optic fiber receptacles.

There is also provided a reversible fiber optic cassette for mounting with other like cassettes in a rack comprising a cassette receiving tray, the tray comprising a plurality of cassette engaging features on an upper surface. The cassette comprises an even plurality of N duplex pairs of optic fiber receptacles arranged along a front thereof, a multifiber receptacle on a back thereof and 2*N optic fiber segments each between a respective one of the optic fiber receptacles and the multifiber receptacle, a first set of N discrete port identifiers on a first surface thereof, each of the first set of port identifiers adjacent and identifying respective ones of the duplex pairs of optic fiber receptacles, a second set of N discrete port identifiers on a second surface opposite the first surface, each of the second set of N port identifiers adjacent and identifying respective ones of the pairs of optic fiber receptacles, a first tray engaging feature extending from the first surface and configured for engaging with one of the cassette engaging features, a second tray engaging feature extending from the second surface and configured for engaging with one of the cassette engaging features, and a release mechanism comprising an actuator for selectively disengaging the tray engaging feature from the engaged one of the cassette engaging features. The first set of N identifiers is the same as the second set of N identifiers and wherein for M between 1 to N, an $M^{th}$ port identifier of the first set and an $(N-M+1)^{th}$ port identifier of the second set is adjacent an $M^{th}$ one of the duplex pairs of optic fiber receptacles.

Additionally, there is provided a reversible fiber optic cassette for mounting with other like cassettes in a rack comprising a cassette receiving tray. The cassette comprises an even plurality of N duplex pairs of optic fiber receptacles arranged along a front thereof, a multifiber receptacle on a back thereof and 2*N optic fiber segments each between a respective one of the optic fiber receptacles and the multifiber receptacle, a first set of N discrete port identifiers on a first surface thereof, each of the first set of port identifiers adjacent and identifying respective ones of the duplex pairs of optic fiber receptacles, a second set of N discrete port identifiers on a second surface opposite the first surface, each of the second set of N port identifiers adjacent and identifying respective ones of the pairs of optic fiber receptacles, and a means for selectively securing one of the first surface and the second surface to the tray. The first set of N identifiers is the same as the second set of N identifiers and wherein for M between 1 to N, an $M^{th}$ port identifier of the first set and an $(N-M+1)^{th}$ port identifier of the second set is adjacent an $M^{th}$ one of the duplex pairs of optic fiber receptacles.

BRIEF DESCRIPTION OF THE DRAWINGS

FIG. 3 provides a top plan view of a pair of reversible cassettes with their covers removed and a trunk cable in accordance with an illustrative embodiment of the present invention;

DETAILED DESCRIPTION OF THE ILLUSTRATIVE EMBODIMENTS

Figure 1:
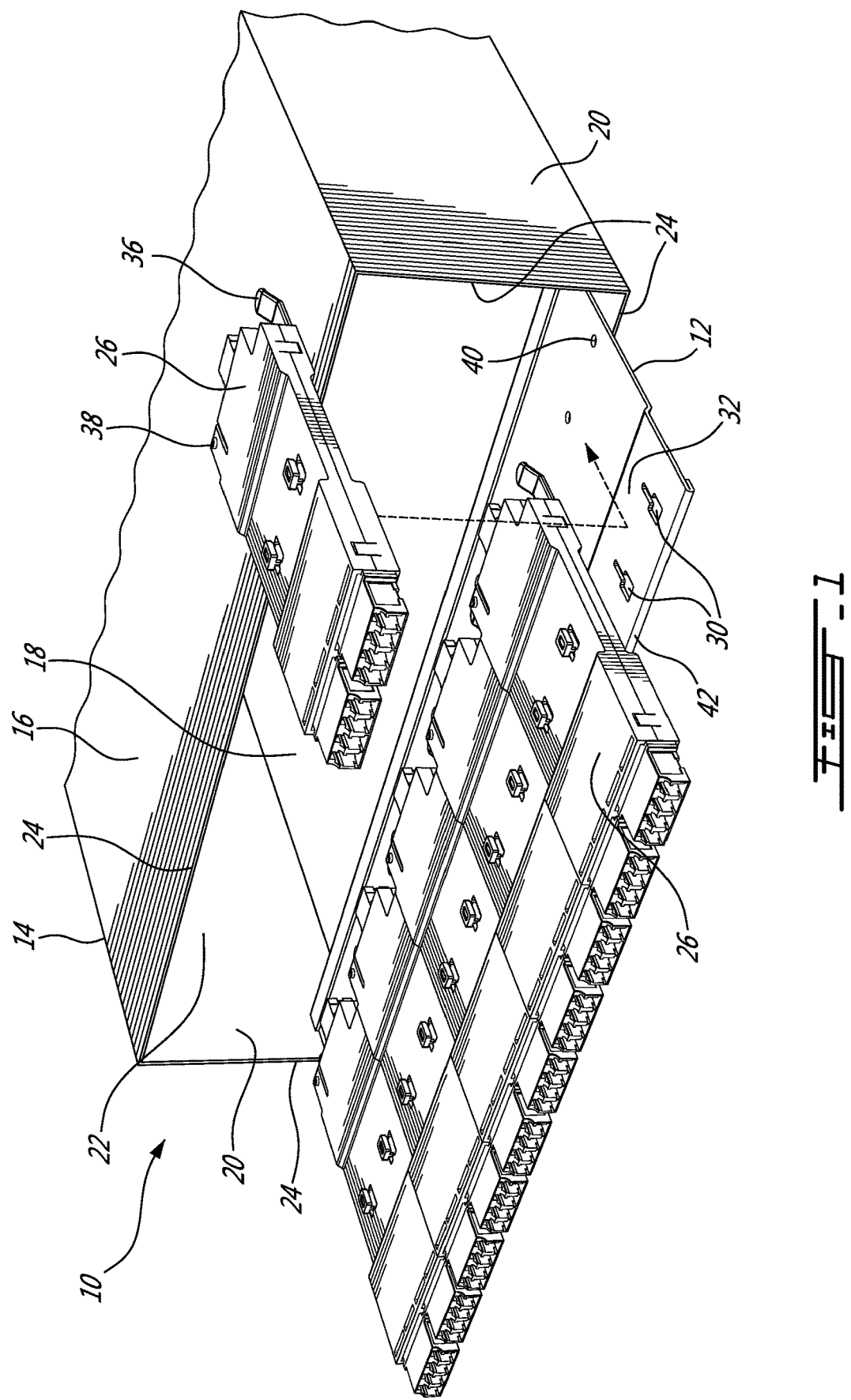
FIG. 1 provides a raised right front perspective view of a fiber optic cassette system with reversible cassettes in accordance with an illustrative embodiment of the present invention.

Referring now to FIG. 1, a fiber optic cassette system with reversible cassettes, generally referred to using the reference numeral 10, will now be described. The fiber optic cassette system 10 comprises a slideable tray 12 illustratively mounted within a case 14. The case 14 comprises a top wall 16, a bottom wall 18 and a pair of opposed side walls 20 defining a tray receiving space 22 therebetween. The case 14 is illustratively mounted to the rails of a rack via a pair of mounting brackets (both not shown). The front edges 24 of the walls 16, 18, 20 define an opening via which the tray receiving space 22 can be accessed. In a particular illustrated embodiment the system 10 is for mounting in a 19" rack, however in a particular embodiment the system 10, with suitable modifications, may be mounted equally in a cross connect system, fiber bay or wall mount or the like (all not shown).

Figure 2:
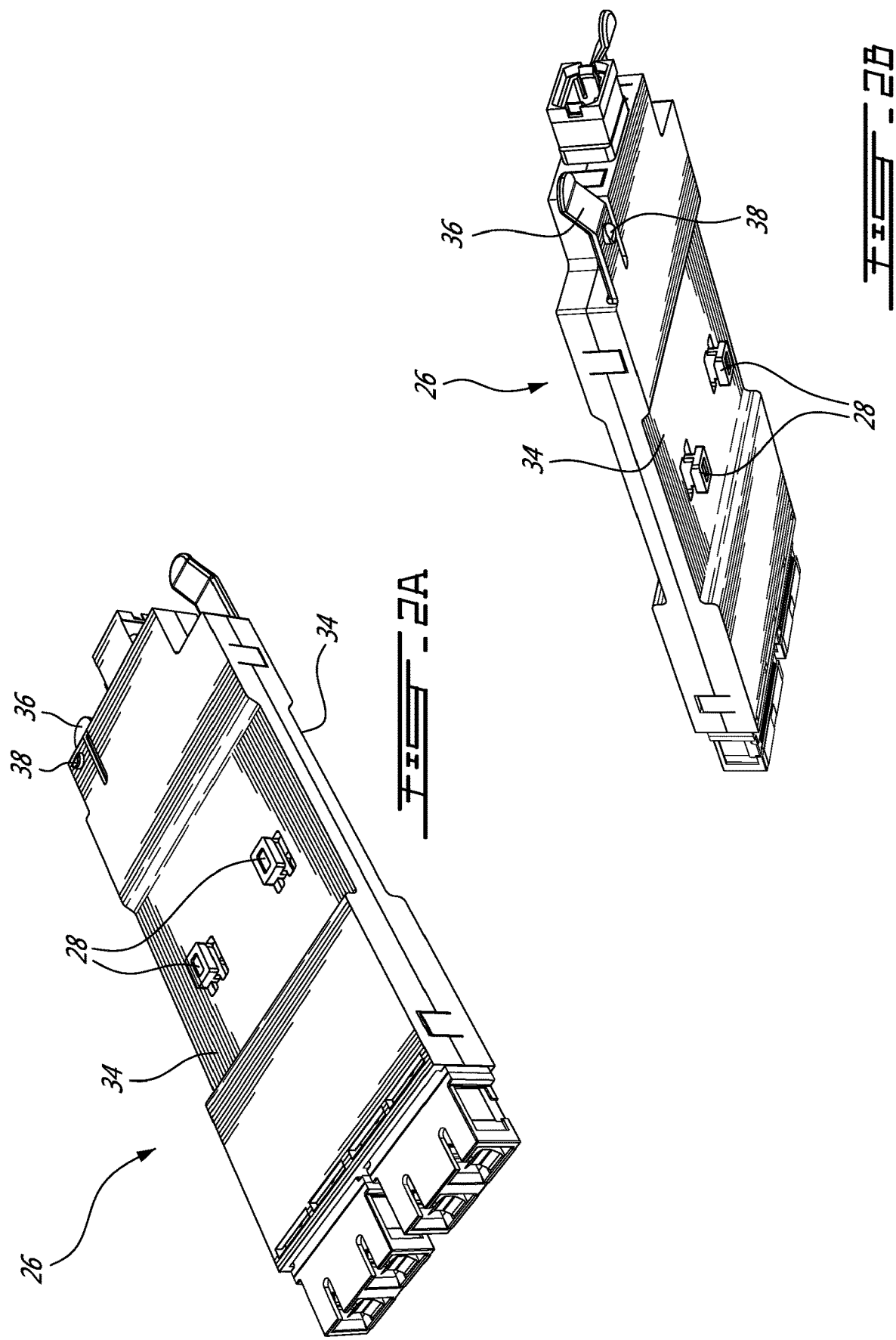
FIGS. 2A and 2B provide respectively a raised right front perspective view of a reversible cassette and a lowered left rear perspective view of a reversible cassette in accordance with an illustrative embodiment of the present invention.

Referring now to FIGS. 2A and 2B in addition to FIG. 1, the tray receives a plurality of fiber optic cassettes 26 arranged side by side on an upper surface 28 thereof. In the disclosed embodiment each fiber optic cassette 26 is secured to the tray 12 using a fastener comprising tabs 28 of inverted "T" cross section which are slid into respective slots 30 machined or otherwise formed in the tray 12. In order to better orient the cassette 26 on the tray 12 during installation, the tray 12 comprises a raised shoulder 32 which is received within a channel 34 moulded or otherwise formed in the cassette 26. Each cassette 26 is releasably held in place by a flexible tab 36 comprising a raised knob 38 which engages with a knob receiving aperture 40 machined or otherwise formed in the tray 12. The cassette 26 can be easily removed from the tray 12 by pulling up on the flexible tab 36 while pulling the cassette towards the front 42 of the tray 12.

Still referring to FIGS. 2A and 2B, of note is that the tabs 28, channel 34 and flexible tab 36 are repeated on both sides of the cassette 26 and such that the cassette 26 may installed on the tray 12 in either a right side up or upside down orientation.

Referring now to FIG. 3, a cassette 26 is interconnected with a another like cassette 26, for example on the same or a different tray, using a trunk cable 44 which comprises a plurality of optic fibres (not shown) terminated at either end by a multi-fiber connector 46 which is engaged in a multi-fiber receptacle 48 arranged on a rearward surface 50 of the cassette 26. Each cassette 26 further comprises a plurality of optic fiber receptacles 52 each arranged in modules 54 along a front thereof which are configured to receive a respective one of a plurality of patch cables 56. Each patch cable 56 comprises a duplex pair of fiber optic cables 58 each terminated by a respective plug 60. The fiber optic cables 58 are each interconnected with a respective one of the optic fibers in the trunk cable 44 by one of a plurality of optic fibre segments 62 held within the cassette 26. The optic fibre segments 62 are typically longer than the spacing between the receptacles 52 and the multi-fiber receptacle 48 and therefore the excess is typically managed typically by winding the excess cable in a serpentine form within the cassette 26.

Still referring to FIG. 3, the multi-fiber receptacle 48 is illustratively a keyed Multipath Optical (MPO) type receptacle for a given number of optic fibers (illustratively 8, although 12, 24, 36 or other numbers could be provided for with suitable modifications to the cassette and which can receive a connector 46 of the an MPO type trunk cable 44 comprising the same given number of optic fibers in a keyed orientation. In a particular embodiment the trunk cable 44 is a Type B trunk cable wherein the order of the optic fibers is reversed between the connectors 46.

Figure 4A:
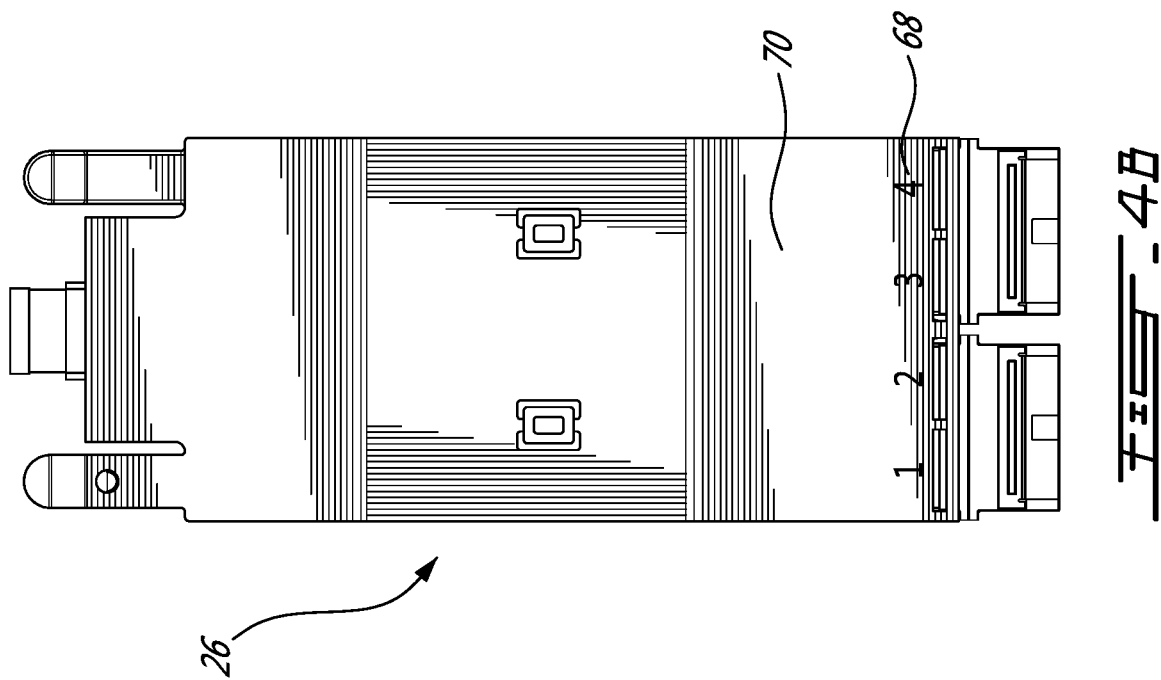
FIGS. 4A and 4B provide respectively a top plan view and a bottom plan view of a reversible cassette in accordance with an illustrative embodiment of the present invention.
Figure 4B:
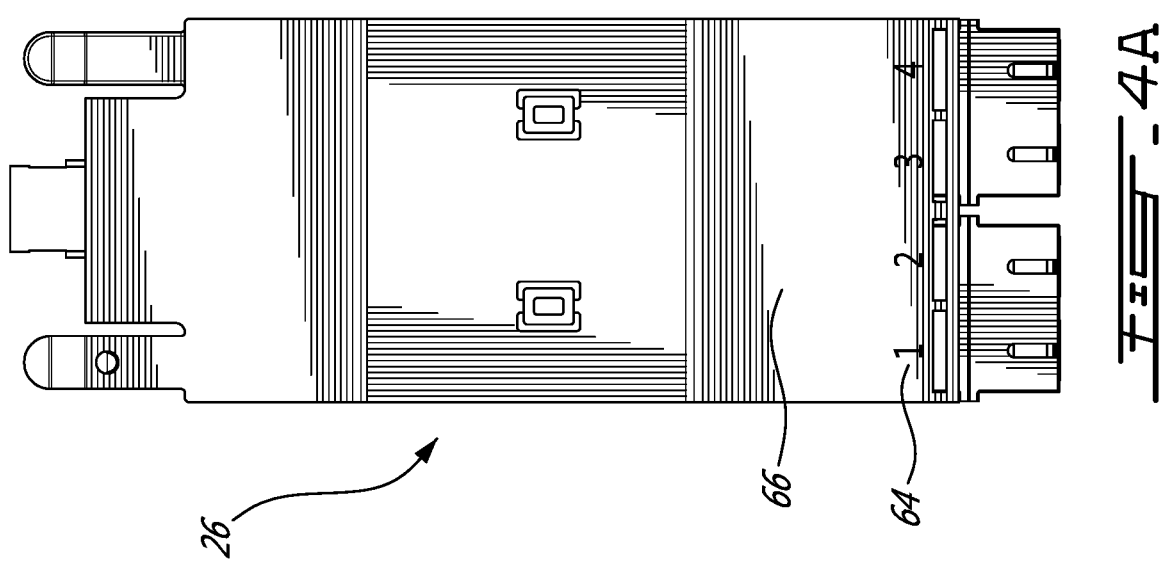

Referring to FIGS. 4A and 4B in addition to FIG. 3, the duplex patch cables 56 transmit data in one direction on a predefined one of the pair of fiber optic cables 58 and in the opposite direction on the other. As such, it is necessary to ensure correct interconnection of optic fibers to ensure that the direction of signal travel is maintained and therefore correct operation. One drawback of existing devices is that when using a Type B trunk cable to interconnect them the optic fibers, and therefore the port numbering of the duplex pairs, is reversed. In order to provide maintain the correct port numbering, each cassette 26 comprises a first set of N port identifiers 64, such as numbers, letters, colours or symbols or the like, moulded or otherwise provided on an upper surface 66 thereof and a second like set of N port identifiers 68 moulded or otherwise provided on a lower surface 70 thereof where N is the number of duplex ports (here 4).

Figure 4C:
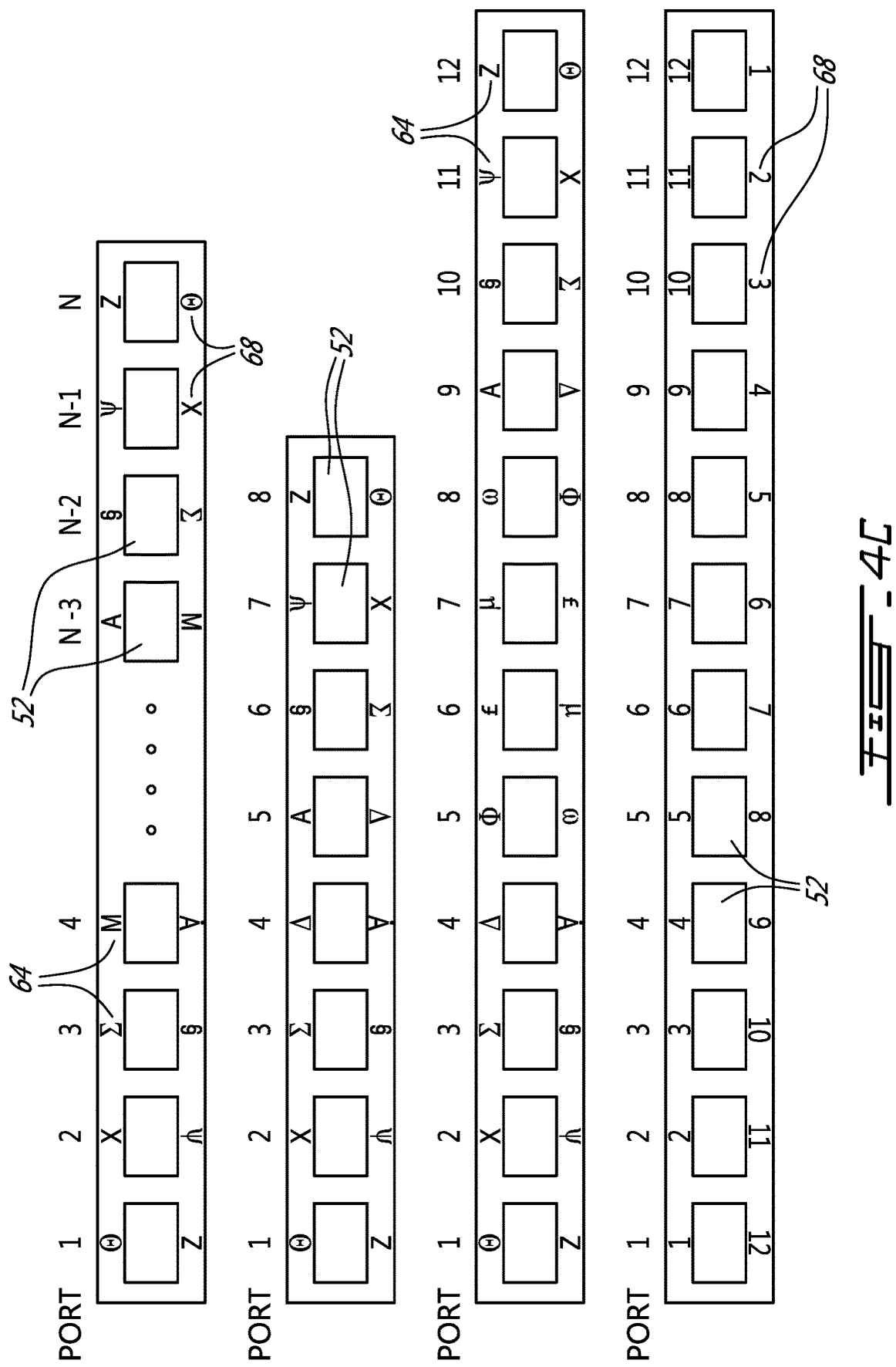
FIG. 4C provides one (1) general and three (3) specific examples of port identification in accordance with an illustrative embodiment of the present invention.

Referring to FIG. 4C in addition to FIGS. 4A and 4B, each of the first set of N port identifiers 64 and the second set of N port identifiers 68 are positioned on their respective surfaces adjacent a respective pair of receptacles 52 (ports) and such that the $M^{th}$ port identifier of the first set and the $(N-M+1)^{th}$ port identifier of the second set are adjacent the same pair of receptacles 52 (port) and where M is from 1 to N.

Referring to FIG. 1 in addition to FIGS. 3, 4A and 4B, as a person of ordinary skill in the art will now understand, when a cassette 26 mounted on a tray 12 and interconnected with a like reversed cassette mounted on a tray 12 using a Type B trunk cable, the port ordering is maintained without having to resort to a different type of cassette. When using LC type receptacles 52 are being used, orientation of the cassette can be easily recognised via the orientation of the receptacles which are keyed to accept a plug 60 in only one orientation.

Although the present invention has been described hereinabove by way of specific embodiments thereof, it can be modified, without departing from the spirit and nature of the subject invention as defined in the appended claims.

The invention claimed is:

1. A fiber optic cassette system comprising:
   a case comprising a tray slideably received within a tray receiving space for movement between a stored position and an accessible position;
   a plurality of substantially flat rectangular fiber optic cassettes each comprising a housing comprising a top surface and a bottom surface and arrangeable horizontally in parallel side by side along a front end of said tray in one of a first position wherein said bottom surface is secured to said tray and a second position wherein said top surface is secured to said tray and such that when arranged on said tray in either said first position or said second position a forward portion of said housing of each of said cassettes extends in front of said tray, each of said cassettes further comprising an even plurality of N duplex pairs of optic fiber receptacles arranged along a front thereof, a multifiber receptacle on a back thereof and 2*N optic fiber segments each between a respective one of said optic fiber receptacles and said multifiber receptacle, a first set of N discrete port identifiers on said top surface and visible from above when said cassette is in said first position, each of said first set of port identifiers adjacent and identifying respective ones of said duplex pairs of optic fiber receptacles, and a second set of N discrete port identifiers on said bottom surface and visible from above when said cassette is in said second position, each of said second set of N port identifiers adjacent and identifying respective ones of said pairs of optic fiber receptacles wherein said first set of N identifiers is the same as said second set of N identifiers and wherein for M between 1 to N, an $M^{th}$ port identifier of said first set and an $(N-M+1)^{th}$ port identifier of said second set is adjacent an $M^{th}$ one of said duplex pairs of optic fiber receptacles.

2. The fiber optic cassette system of claim 1, wherein each of said cassettes comprises an engagement for securing a selected one of said top surface and said bottom surface to said tray, said engagement comprising a first engaging part on said tray, a second engaging part on said top surface and a third engaging part on said bottom surface.

3. The fiber optic cassette system of claim 2, wherein said first engaging part comprises at least one slot, said second engaging part comprises at least one first flexible hooked tab and said third engaging part comprises at least one second flexible hooked tab and further wherein when in said first position, said second flexible hooked tab is engaged in said slot and when in said second position, said first flexible hooked tab is engaged in said slot.

4. The fiber optic cassette system of claim 2, wherein said tray comprises a raised shoulder comprising said second engaging part along a forward edge thereof, each of said cassette housing comprises a forward portion adjacent a shoulder receiving channel portion comprising said first engaging part and further wherein, when installed on said tray, said first engaging part extends no farther than a plane defined by a bottom surface of said forward portion.

5. The fiber optic cassette system of claim 1, wherein said case comprises a top wall and a bottom wall and two opposed side walls, each of said sidewalls attached between respective side edges of said top and bottom wall, said walls together defining said tray receiving space there between and a forward edge of each said wall together defining an opening to said tray receiving space.

6. The fiber optic cassette system of claim 5, wherein in said stored position said cassettes are completely inside said tray receiving space and in said accessible position said toward portions of said cassettes are positioned in front of said opening and outside of said tray receiving space.

7. The fiber optic cassette system of claim 1, wherein said system is for mounting in a rack and further comprising a pair of mounting brackets, one of said brackets attached to each of said sidewalls on either side of an outside of said case, said mounting brackets for securing said case to the rack.

8. The fiber optic cassette system of claim 1, wherein each cassette is immediately adjacent at least one other cassette.

* * * * *